(12) United States Patent
Köster

(10) Patent No.: US 11,584,176 B2
(45) Date of Patent: Feb. 21, 2023

(54) SYSTEM FOR IDENTIFYING A TRAILER AND FOR ASSISTING A HITCHING PROCESS TO A TRACTOR MACHINE

(71) Applicant: SAF-HOLLAND GmbH, Bessenbach (DE)

(72) Inventor: Mario Sebastian Köster, Bodman-Ludwigshafen (DE)

(73) Assignee: SAF-Holland GmbH, Bessenbach (DE)

( * ) Notice: Subject to any disclaimer, the term of this patent is extended or adjusted under 35 U.S.C. 154(b) by 408 days.

(21) Appl. No.: 16/639,696

(22) PCT Filed: Aug. 24, 2018

(86) PCT No.: PCT/EP2018/072867
§ 371 (c)(1),
(2) Date: Feb. 17, 2020

(87) PCT Pub. No.: WO2019/042882
PCT Pub. Date: Mar. 7, 2019

(65) Prior Publication Data
US 2020/0307328 A1 Oct. 1, 2020

(30) Foreign Application Priority Data
Aug. 31, 2017 (DE) .................... 10 2017 119 968.3

(51) Int. Cl.
*B60R 1/00* (2022.01)
*G06K 19/00* (2006.01)
(Continued)

(52) U.S. Cl.
CPC ............... *B60D 1/36* (2013.01); *G01B 11/27* (2013.01); *G01C 3/08* (2013.01); *G06V 20/56* (2022.01);
(Continued)

(58) Field of Classification Search
CPC .... B60D 1/62; B60D 1/36; B60D 1/01; B60R 1/003; B60R 11/04; B60R 2300/103;
(Continued)

(56) References Cited

U.S. PATENT DOCUMENTS

2005/0074143 A1* 4/2005 Kawai ................. B60D 1/62
382/104
2010/0324770 A1* 12/2010 Ramsey ................ B60D 1/36
701/28
(Continued)

FOREIGN PATENT DOCUMENTS

DE   10 2014 012 330 A1   2/2016
DE   10 2016 218 603 A1   3/2018
(Continued)

OTHER PUBLICATIONS

European Patent Office; International Search Report; dated Nov. 30, 2018.

*Primary Examiner* — Zhihan Zhou
(74) *Attorney, Agent, or Firm* — Price Heneveld LLP

(57) ABSTRACT

A trailer having a kingpin or having a drawbar for coupling a tractor unit on a coupling side of the trailer, wherein the trailer has a detectable pattern on its coupling side, and a tractor unit for coupling to a kingpin or a drawbar of a trailer, wherein the tractor unit has, for the identification of a trailer and/or for assisting a coupling process, in particular on a coupling side of the drawbar, a detection unit for detecting a detectable pattern.

14 Claims, 6 Drawing Sheets

(51) Int. Cl.
*B60D 1/36* (2006.01)
*G01B 11/27* (2006.01)
*G01C 3/08* (2006.01)
*G06V 20/56* (2022.01)
*B60R 11/04* (2006.01)
*G06K 19/06* (2006.01)
*B60D 1/01* (2006.01)

(52) U.S. Cl.
CPC ............... *B60D 1/01* (2013.01); *B60R 1/003* (2013.01); *B60R 11/04* (2013.01); *B60R 2300/103* (2013.01); *G06K 19/06028* (2013.01)

(58) Field of Classification Search
CPC .... G01C 3/08; G06K 19/06028; G01B 11/27; G06V 20/56
See application file for complete search history.

(56) References Cited

U.S. PATENT DOCUMENTS

| | | | |
|---|---|---|---|
| 2014/0200759 | A1 | 7/2014 | Lu et al. |
| 2015/0345939 | A1* | 12/2015 | Salter ..................... F21S 43/26 356/138 |
| 2016/0052548 | A1 | 2/2016 | Singh et al. |
| 2017/0313141 | A1* | 11/2017 | Casasanta ................ B60D 1/62 |
| 2018/0040129 | A1* | 2/2018 | Dotzler ................... B60R 11/04 |
| 2018/0319438 | A1* | 11/2018 | Herzog ................... B60R 11/04 |

FOREIGN PATENT DOCUMENTS

| | | |
|---|---|---|
| JP | 2002012172 A | 1/2002 |
| WO | 2009006529 A1 | 1/2009 |
| WO | 2016065017 A1 | 4/2016 |
| WO | 2017123880 A1 | 7/2017 |

* cited by examiner

SYSTEM FOR IDENTIFYING A TRAILER AND FOR ASSISTING A HITCHING PROCESS TO A TRACTOR MACHINE

BACKGROUND OF THE INVENTION

The present invention relates to a trailer having a kingpin or having a drawbar for coupling a tractor unit on a coupling side of the trailer and relates to a tractor unit for coupling to a kingpin or to a drawbar of a trailer and to a coupling system for identifying a trailer and/or for assisting a coupling process between a trailer and a tractor unit.

After the location of a trailer has been manually determined, for example in a vehicle fleet, a driver of a tractor unit usually determines the alignment of the trailer visually and carries out the coupling between the trailer and the tractor unit manually. In order to determine the location of a trailer correctly and couple a trailer to a tractor unit there is therefore a need for a certain degree of practice and experience on the part of the driver.

The present invention is therefore based on the object of making available a trailer whose location is easy to determine and which can be easily coupled. In addition, the present invention is based on the object of making available a tractor unit with which a trailer can be automatically identified and coupled, and of making available a corresponding system for identifying and/or for assisting a coupling process.

SUMMARY OF THE INVENTION

According to the invention, a trailer having a kingpin or having a drawbar for coupling a tractor unit on a coupling side of the trailer is proposed, wherein the trailer has, on its coupling side a detectable pattern for identifying the trailer and/or for assisting the coupling process. The coupling side of the trailer preferably comprises a connection to the kingpin or to the drawbar of the trailer. The coupling said of the trailer is in particular and/or consequently that side of the trailer which lies directly opposite a tractor unit after a coupling process to said tractor unit. In other words, the coupling side can therefore be the front end of the trailer which has, particularly in the case of straight-ahead travel of the trailer, an outwardly directed perpendicular line in the direction of travel. On the coupling side, the trailer has a detectable pattern for identifying the trailer and/or for assisting the coupling process. This pattern can be embodied, for example, on the coupling side as permanently predefined points which can be detected by a detection unit. These detected patterns or the permanently predefined points or a permanently predefined point are preferably arranged in a region of the trailer which can be scanned easily and reliably. The detectable pattern or the permanently predefined points of the detectable pattern is/are preferably arranged in an upper end region extending from the ground and/or centrally, in particular in the lateral direction of the trailer, above the kingpin on the coupling side of the trailer. The detectable pattern has, inter alia, the advantages that the trailer can be unambiguously identified and the arrangement of the detectable pattern on the coupling side can contribute to an autarkic coupling process. In addition it is conceivable that the external dimensions of the trailer can be detected. In particular, the detected external dimensions of the trailer can be used in an evaluation of the detectable pattern in order to make a coupling process even more reliable.

The detectable pattern preferably has at least one permanently predefined point, particularly preferably at least two permanently predefined points which can be detected by a detection unit. A point can be understood in this context as meaning, inter alia, that the point has a maximum diameter of 5 cm to 15 cm because the applicant has found that with such dimensioning particularly reliable detection of the point is possible. The permanently predefined points also preferably have a contrast by means of which the permanently predefined points are highlighted with respect to the coupling side of the trailer. For example, this contrast can be achieved by virtue of the fact that the point is embodied in an actively and/or passively light-emitting fashion. A point is passively light-emitting, inter alia, if the point has a light-reflecting surface. As a result, the detectable pattern can be easily and reliably detected by means of a detection unit. When a plurality of permanently predefined points are being detected, a distance from the trailer and an angle with respect to the trailer can also be reliably determined. For this purpose, the detection unit is in contact, for example, with a control unit or is connected to such a unit, wherein a computer program with which a current distance and/or a current angle between the trailer and the tractor unit can be determined is implemented in the control unit.

At least one point, preferably most and particular preferably all the points, are expediently embodied in an actively light-emitting fashion. A point is actively light-emitting in particular when it has, for example, an LED, an electric bulb or some other light-generating device. As a result, it can be ensured that reliable detection of the point is made possible even in the dark or under poor visibility conditions.

Preferably at least two points are embodied in an actively and/or passively light-emitting fashion, wherein the two points emit light in different colors. Different colors are provided, in particular, when the wavelengths of the emitted light of the points have a difference of 50 nm. The wavelength of the main frequency (frequency Peak) of the emitted light spectrum of the point is decisive here for the determination of the wavelength. As a result of the provision of points in different colors, it is possible, on the one hand, to simplify the detection and, on the other hand, as a result, the determination of the alignment of the trailer can be simplified.

At least one point is expediently actively light-emitting, wherein the emitted light is dynamically variable. The emitted light is dynamically variable e.g. when it is switched on and off at a certain frequency. Alternatively and/or additionally, an emitted light can, for example, also be dynamically variable when a cyclical change in color of the emitted light takes place. The light which is emitted in a dynamically variable fashion permits the identification of the point and/or of the trailer to be simplified. Additionally or alternatively, the dynamically variable light can, for example, also be used to transfer information relating to the trailer.

In one preferred embodiment, the actively light-emitting point and/o the trailer has/have a sensor device, wherein the one sensor device is configured, inter alia, to receive a signal, wherein the sensor device is configured, if it receives the signal, to transmit a control signal to the light-emitting point so that the point is changed from a non-light-emitting state into a light-emitting state. In other words, this can mean that the sensor device serves to "switch on" the light-emitting point when a signal is received. This can ensure that energy can be saved. It is particularly preferred here to configure not just one light-emitting point but rather all the actively light-emitting points of the trailer in this way.

The detectable pattern is preferably arranged in a predefined region on the coupling side of the trailer, so that after the detectable pattern has been detected by a detection unit it is possible to determine an, in particular exact, position of the kingpin or of the drawbar. Arranging the detectable pattern at permanently predefined positions in predefined regions on the coupling side of the trailer permits the alignment and/or the position or distance with respect to the trailer to be reliably determined, wherein, in particular, it does not require any manual assistance by a driver of the tractor unit or the like.

The at least two permanently predefined points of the detectable pattern are preferably arranged at a predefined distance from one another and/or at a predefined distance from the kingpin or from the drawbar. By arranging the permanently predefined points at a predefined distance it is possible, by detecting the permanently predefined points, to determine, in particular calculate, a current distance and/or a current angle with respect to the trailer quickly and easily. In addition, for example by means of the predefined arrangement of the permanently predefined points of the pattern it is possible to take into account an assignment to a model or to a model class of a trailer. The distance and/or the angle between the detection unit and the tractor machine with respect to the coupling side of the trailer can be determined by means of a detection unit.

The at least two permanently predefined points of the detectable pattern are preferably arranged on the coupling side of the trailer in such a way that the ratio of the distance between these two points with respect to the extent of the coupling side of the trailer, in particular in the vertical and/or horizontal direction, is between 0.5 and 0.99, in particular between 0.7 and 0.98 and particularly preferably in a range from 0.8 to 0.98. As a result, particularly exact detection of an angle between the trailer and the tractor unit is made possible.

In particular, at least one predefined point is arranged in a region above the kingpin or—when viewed in the horizontal direction—centrally on the coupling side of the trailer, so that in addition, in particular, this at least one predefined point forms a triangular configuration with the two permanently predefined points on the upper end region. In this case, the detectable pattern has a triangular configuration. It is also conceivable that the detectable pattern has two or more than three permanently predefined points, so that the permanently predefined points form a detectable pattern with a different configuration. The permanently predefined points can be distributed symmetrically and/or asymmetrically on the coupling side of the trailer. It is also conceivable that the detectable pattern is arranged as a bar pattern with a predetermined position and/or length on the coupling side of the trailer. In particular, the detectable pattern is arranged at a predefined distance from the kingpin. As a result, the position, in particular the height, of the kingpin, can be determined by the detection of the detectable pattern. It is also conceivable that a configuration of the pattern is assigned to a trailer type.

The at least one and/or the at least two permanently predefined points are also preferably highlighted by a contrast and/or marking with respect to the coupling side so that the at least one permanently predefined point and/or the at least two permanently predefined points can be detected by the detection unit. The contrast can be embodied, for example, as a color contrast and/or as a relief. Such a contrast can be detected by a detection unit. A marking can be embodied, for example, in such a way that it can be detected, in particular seen, by means of special optics. In addition, the region of the pattern is preferably coated with a coating which brings about a lotus effect. This ensures that the contrast always is or remains visible.

The at least one permanently predefined point and/or the at least two permanently predefined points also preferably has/have a numerical code, a barcode, a matrix code and/or a color code and/or a marking pointing in the direction of the kingpin or the drawbar. In particular, the permanently predefined points are embodied as such a code or such a marking. An identification of the trailer, in particular with respect to the model and/or other data, can be stored by storing such a code in the permanently predefined points and/or in the detectable pattern. It is, for example, conceivable that the corresponding code and/or marking can be stored on the trailer with information about the trailer which can be stored and/or overwritten, in particular information about the current load state, about the tire pressure, about servicing intervals etc., wherein this information can be read out by a control unit. In particular, such information can be read out by a control unit which is integrated in a tractor unit which is to be coupled, and can be displayed to a driver of the tractor unit on a monitor. Consequently, storing a code has the advantage that before a coupling process the driver of the tractor unit can check whether the selection of the trailer to be coupled has been made correctly.

A distance between the pattern on the coupling side of the trailer and the kingpin or the drawbar is also preferably stored in the pattern, wherein, in particular, the distance is stored as a color code or as a barcode or as a matrix code or the like. As a result of storing the distance between the pattern and the kingpin or the drawbar it is also possible, after the detection of the pattern, to estimate with which wheel setting at the tractor unit a coupling occurs in an optimum way as a function of the distance between the tractor unit and the trailer.

The invention also provides a tractor unit for coupling to a kingpin or to a drawbar of a trailer, wherein the tractor unit has, for identifying the trailer and/or for assisting a coupling process, in particular on a coupling side of the tractor unit, a detection unit for detecting a detectable pattern, in particular on the trailer. The proposed tractor unit has a detection unit which is designed to detect a detectable pattern on a trailer. It is also conceivable that the detection unit is in contact with a control unit, wherein the control unit is connected to the detection unit or is integrated into the detection unit. After the detectable pattern has been detected, the detectable pattern can be evaluated, in particular by the control unit. Such an evaluation occurs with respect to the various aspects described herein, to which reference is hereby made.

According to a further preferred embodiment, the detection unit comprises a camera system and/or a sensor system for detecting the detectable pattern of a trailer, in particular according to a trailer as described herein. When a camera system is used, a 2-D camera, preferably a 3-D camera is used. With a camera system it is possible to detect the detectable pattern visually, in particular with a camera system it is possible to detect depth of field and relief. For example, a CCD camera could also be used. It is particularly preferred if the camera system has at least two cameras which are spaced apart horizontally and/or vertically with respect to one another, because in this way the distance from the pattern can be determined particularly easily. It is alternatively or additionally also conceivable to use a sensor system which can detect such a detectable pattern on the basis of other physical effects. The sensor system could detect and/or emit infrared radiation or radar waves or the like. For example, the detectable pattern could be embodied in a fluorescent fashion or the like.

The detection unit is preferably designed to detect a distance and/or an angle with respect to the detectable pattern of the trailer, in order to determine a current alignment of the trailer to be coupled and/or a distance from the trailer. After the detection and evaluation of a current angle and/or distance with respect to the trailer, in order to carry out a coupling process between the tractor unit and the trailer, the wheel setting of the tractor unit can be controlled or changed in such a way that a coupling process can be carried out autarkically by the tractor unit which is embodied, in particular, in a self-propelling fashion. In order to determine the current angle and/or the current distance, a computer program, which is designed to calculate or estimate the angle and/or the distance, is implemented in a control unit. This calculation or estimation of the angle and/or of the distance is particularly preferably carried out by a computer-implemented neural network. The alignment can be determined here, in particular, by comparing the detected height and/or width ratios of the pattern with the (known) height and/or width ratio.

The detection unit is preferably designed to detect trailer edges of the trailer to be coupled, in order to determine a spatial ratio between the trailer edges and/or between the trailer edges and the detectable pattern, so that an alignment of the trailer to be coupled and/or a distance from the trailer can be determined. The trailer edges can be, in particular, additionally or else exclusively detected, as a result of which, in particular, the alignment for a coupling process of the trailer can be determined and compared with an optimum alignment. An optimum alignment can be stored, for example, in the control unit. In the case of a deviation between the detected alignment and the optimum alignment, the control unit can influence, for example, the wheel settings of the tractor unit in such a way that the optimum alignment between the trailer and the tractor unit is achieved as well as possible in relation to one another, in order to carry out a coupling process.

In particular, a height of the trailer from the surface of the Earth can be acquired by the detection unit. The detected height consequently provides a distance from the surface of the Earth, as result of which a load state and/or filling level of a possible air suspension system of the trailer can be estimated. The detection unit is particularly preferably designed to detect the height of the trailer—and therefore the vertical position of the coupling device of the trailer—in order thereby to ensure a problem-free coupling process between the tractor unit and trailer. In particular, overloading of the trailer can be detected, in the case of which a coupling process would cause damage to the tractor unit and/or the trailer.

The detection unit, in particular the camera system or a camera of the camera system is also preferably designed to record an image with a permanently predefined total number of pixels, wherein the detectable pattern and/or the trailer edges are/is detected in a subset of the total number of pixels, and by evaluating the subset of pixels at which the detectable pattern and/or the trailer edges are/is detected it is possible to acquire a current distance and/or an angle between the detection unit and the trailer. The lower the number of the pixels which detect the detectable pattern, the greater the current distance between the trailer and the tractor unit. On the other hand, the higher the number of the pixels which detect the detectable pattern, the smaller the current distance between the trailer and the tractor unit. Generally, the number of pixels which detect the detectable pattern depends on the distance between the detection unit and the detectable pattern, a resolution of the detection unit, a detection angle of the detection unit, for example 60°, 90°, 120° or the like, and/or an edge length of the detectable pattern to be detected. In addition, an asymmetrical distribution of the subset of pixels which have detected the pattern indicates that the trailer and the tractor unit are at an angle with respect to one another. The term asymmetrical distribution means here that, for example, in a region on the coupling side a number $n>0$ of pixels has detected a permanently predefined point of the pattern, while a different symmetrically arranged, permanently predefined point of the pattern is detected only by a number $m>0$ of pixels, wherein $m<n$, and m and n are natural integers. If an angle of approximately 90° were provided between an extent of the detection unit and the coupling side, it would be the case that $m=n$. An angle is determined by means of pixels in principle by means of perspective modelling. In this context, software calculates an offset of the pixels. This means that it is detected, for example, that the ends of an edge are offset by 20 pixels long and two pixels in height so that this edge is detected with an angle. The more pixels such an offset comprises, the greater the angle. If, for example, the offset for a linearly extending edge is equal to 0 in height, the detection unit and the detectable pattern are oriented parallel to one another.

In addition, according to the invention, a coupling system for identifying a trailer and/or for assisting a coupling process between a trailer and the tractor unit is provided, comprising a trailer as described above and a tractor unit as described above, wherein the coupling system is designed to carry out a coupling process between the trailer and the tractor unit autarkically and, in particular, automatically. Through the interaction of a trailer described herein with a tractor unit described herein, a coupling system is advantageously disclosed which is designed to identify a trailer to be coupled and/or to assist a coupling process between the tractor unit and the trailer in such a way that the coupling process can be carried out autarkically, in particular, without intervention by a driver of the tractor unit. Reference is made to the advantageous embodiments of the trailer and the advantageous embodiments of the tractor unit as described herein, and will not be repeated again here. It goes without saying that the proposed coupling system is embodied with the trailer described herein and the tractor unit described herein, and an advantageous coupling system is made available by synergy effects between the two, with which coupling system a coupling process can be carried out autarkically or automatically.

A current distance between the trailer and the tractor unit and/or a current position can preferably be transferred to the tractor unit from the trailer via a wireless connection, wherein the tractor unit is designed to acquire a distance with respect to the trailer from the current position. For this purpose, the trailer can be embodied, for example, with a trailer controller with which the location of the trailer can be determined, for example, in a vehicle fleet and with which a current position and/or alignment of the trailer can be determined.

BRIEF DESCRIPTION OF THE DRAWINGS

Further advantages and features of the present invention are evident from the following description of preferred embodiments with reference to the appended figures. It goes without saying that individual embodiments which are shown in the respective figures can have features which can also be used in other embodiments even if this is not explicitly mentioned, provided that this is not excluded owing to technical circumstances or explicitly ruled out. In the figures.

DETAILED DESCRIPTION OF THE PREFERRED EMBODIMENTS

Figure 1:
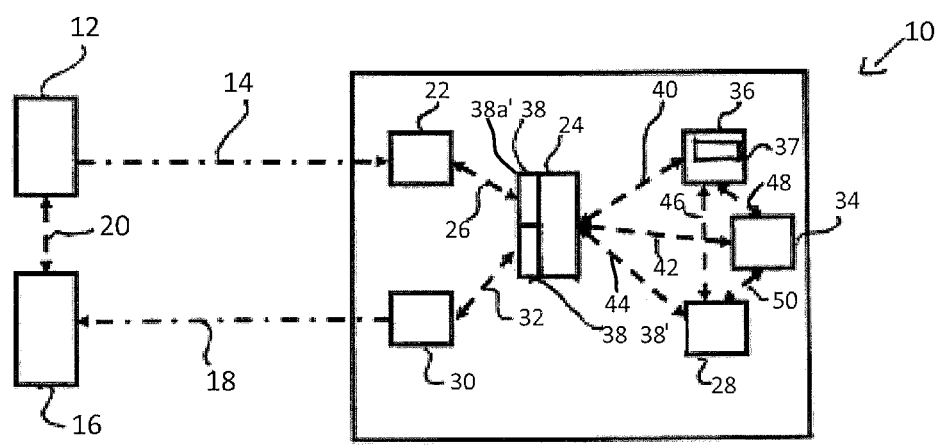
FIG. 1 shows a schematic view of a trailer controller which can interact with a transmitter unit and/or a receiver unit.

FIG. 1 shows a trailer controller 10 which can communicate with a transmitter unit 12. The communication between the transmitter unit 12 and the trailer controller 10 is indicated by the arrow 14. In addition, the trailer controller 10 can communicate with a receiver unit 16. This communication is indicated by the arrow 18. In addition, it is conceivable that the transmitter unit 12 and the receiver unit 16 can communicate with one another, which is indicated by the double arrow 20. It is conceivable that the transmitter unit 12 and the receiver unit 16 are combined in one unit (not illustrated).

In order to receive a signal from the external transmitter unit 12, the trailer controller 10 has a receiver unit 22 which transfers the received signal to a comparator 24. Between the receiver unit 22 and the comparator 24 there can be a wire connection or a wireless connection. The communication between the comparator 24 and the receiver unit 22 is illustrated in FIG. 1 by the double arrow 26. The comparator 24 is designed to compare the received signal with a predefined signal. The predefined signal can be stored here in the comparator 24 itself or in a memory unit 28. The comparator 24 and the memory unit 28 can communicate with one another (double arrow 44).

If the received signal corresponds to the predefined signal, the comparator 24 transfers a response signal to a transmitter unit 30, which is indicated by the double arrow 32. In addition to the predefined signal, the current position and/or the response signal or other data can be newly stored or already stored in the memory unit 28.

In particular, the memory unit 28 is communicatively connected to further units 34, 36, 38. The communication between the units 24, 28, 34, 36, 38 is indicated schematically by the double arrows 40, 42, 44, 46, 48, 50.

As illustrated in FIG. 1, the memory unit 28 is coupled, for example, to a position-determining unit 36. The position-determining unit 36 is embodied, in particular, as a GPS unit and serves to determine a current position of the trailer controller 10. The position-determining unit 36 is connected to the comparator 24 and/or an encryption unit 38, 38b or a decryption unit 38, 38a for communication. In particular, the decryption unit 38, 38a and the encryption unit 38, 38b are embodied as one unit. It is also conceivable that the decryption unit 38a and the encryption unit 38b are embodied as two different units. The encryption unit 38, 38b or the decryption unit 38, 38a are optional.

As illustrated in FIG. 1, the trailer controller 10 can have an energy source 34 which supplies the further units of the trailer controller with energy. The energy source 34 can be embodied, for example, with an accumulator which can charge itself if a trailer on which the trailer controller 10 is mounted is coupled to a tractor unit.

Figure 2:
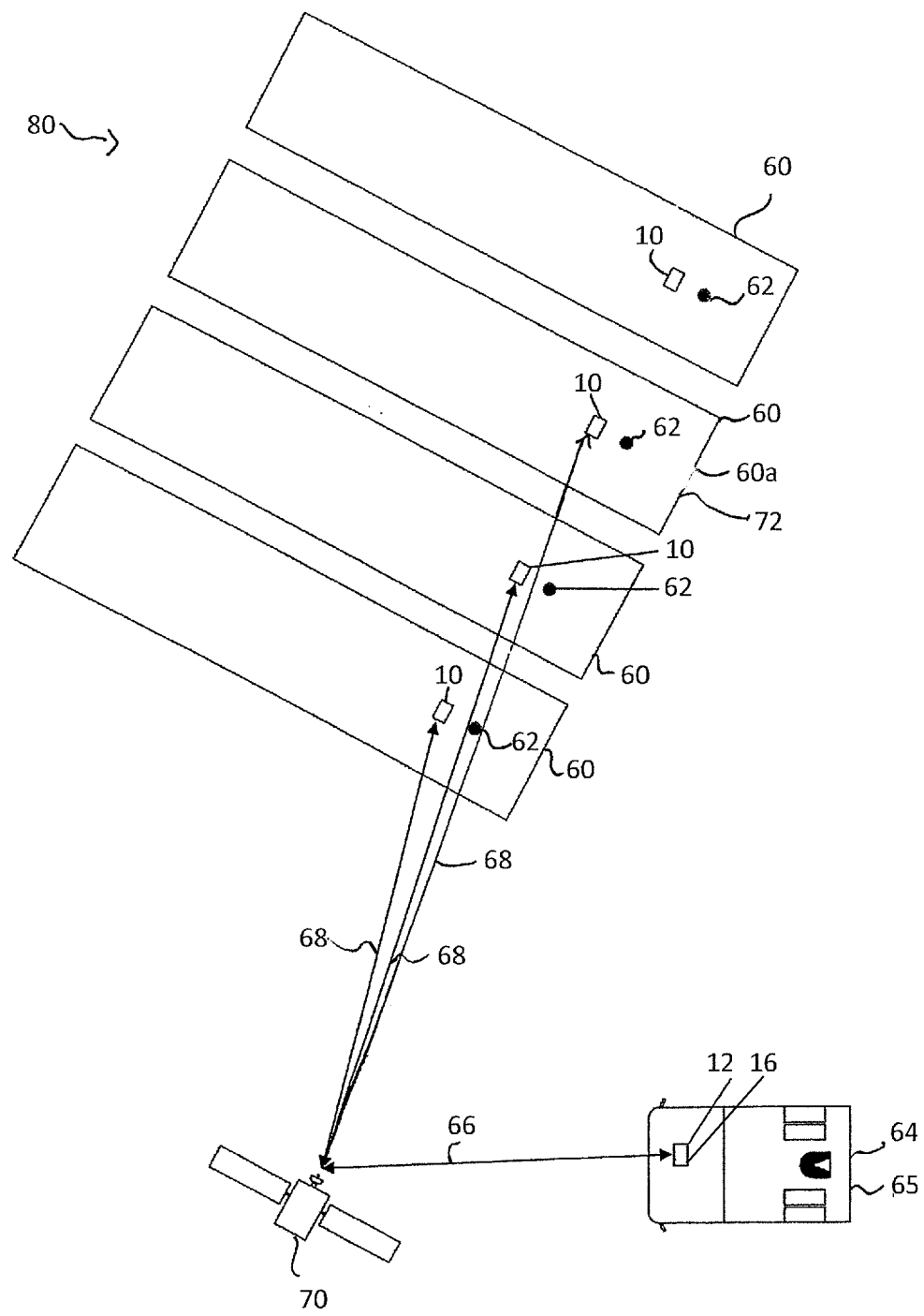
FIG. 2 shows a system for determining the location of and/or identifying a trailer with a trailer controller.
Figure 3:
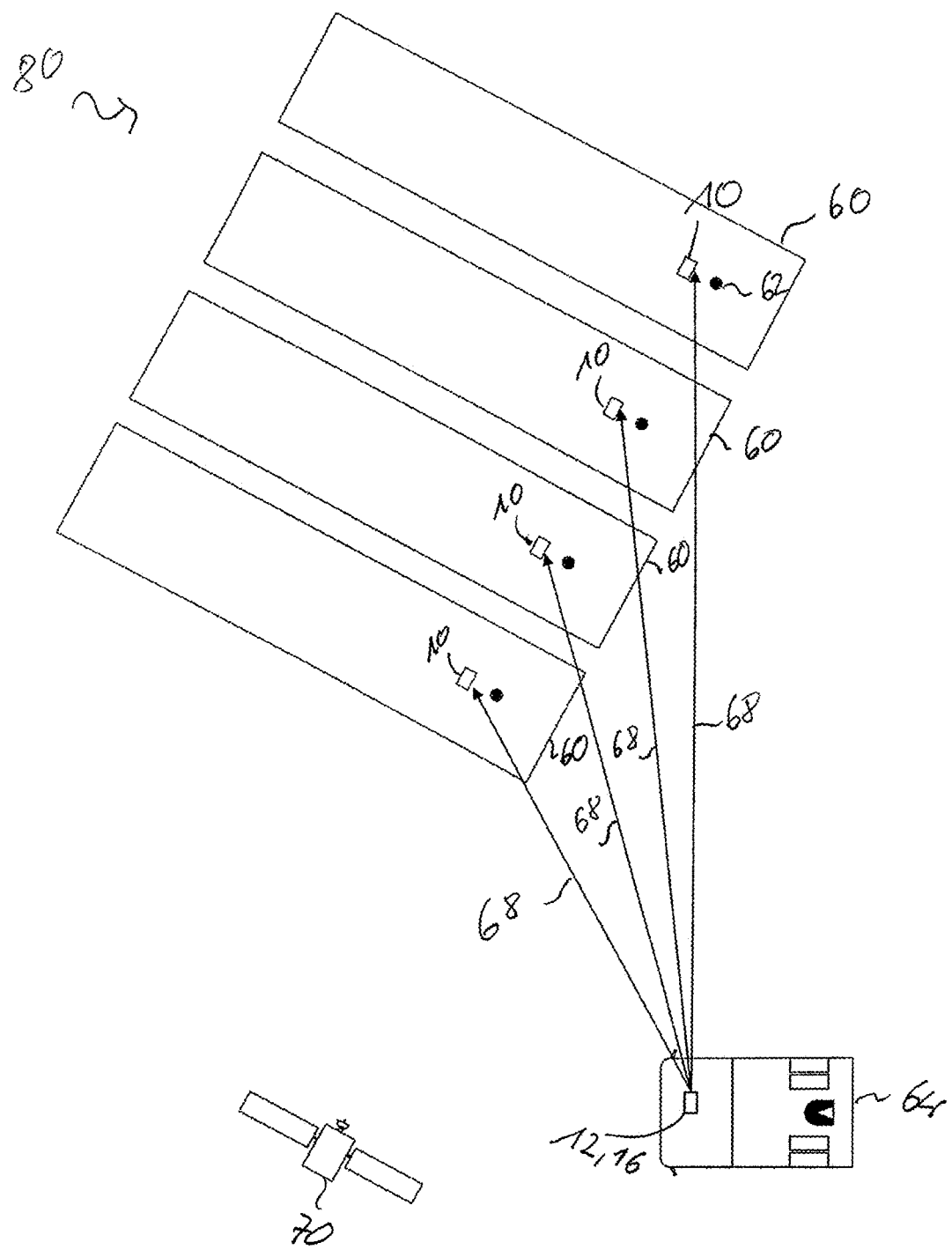
FIG. 3 shows an alternative embodiment of the system according to FIG. 2.
Figure 4:
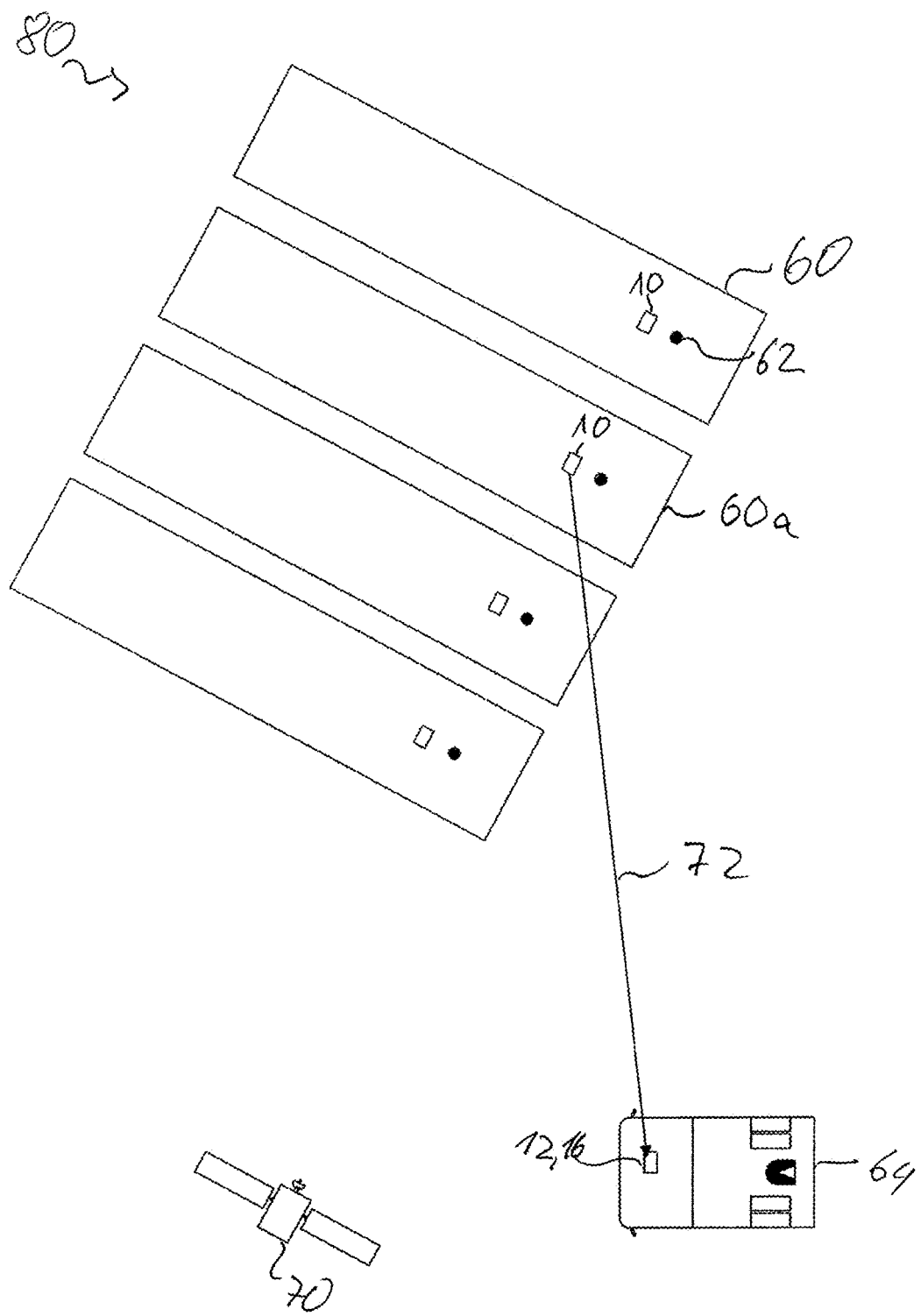
FIG. 4 shows a system according to FIGS. 3 and 2, which system transmits a response signal to an external receiver unit.

Various embodiments of a system 80 are explained with respect to FIGS. 2, 3 and 4 in combination. FIGS. 2, 3 and 4 each show an embodiment of the system 80. In particular, FIG. 2 shows how a tractor unit 64, which comprises the external transmitter unit 12 and/or the external receiver unit 16, transmits a signal to an external GPS unit 70. The external GPS unit 70 passes on the signal to the trailer controllers 10, which are each mounted on a trailer 60. The signal forwarding lines are each indicated by the arrows 66 and 68 in FIG. 2. Each of the trailers 60 has, in addition to the trailer controller 10, a kingpin 62, to which the tractor unit 64 is or can be coupled. As illustrated in FIG. 2, the tractor unit 64 or the external transmitter unit 12 of the tractor unit 64, firstly transfers a signal to a plurality of trailers 60, in order to acquire the current position of a trailer 60a whose location is to be determined.

FIG. 2 shows an embodiment of the system in which the tractor unit 64 or the positionally fixed logistics unit transfers the signal, to be received by the trailers 60, to the trailer 60 via an external GPS unit 70. According to the embodiment which is illustrated in FIG. 3, the tractor unit 64 or the positionally fixed logistics unit transmits the signal directly to the trailer controllers 10 of the trailers 60. This can also be done, for example, via local transmission masts (not illustrated). The received signal is, as already described above with respect to FIG. 1, evaluated, i.e. compared with a predefined signal, by each trailer 60 or by each trailer controller 10 which is mounted on a trailer 60. When a predefined signal corresponds to the received signal, a trailer 60, i.e. the trailer 60a whose location is to be determined, transmits back a response signal to the receiver unit 16 in the tractor unit 64. In the proposed system 80, in order to determine the location of a trailer 60a of a plurality of trailers 60, an interrogation signal is firstly transmitted to a plurality of trailers 60. The corresponding trailer 60a whose location is to be determined transmits back a response signal to the tractor unit 64 or to the positionally fixed logistics unit only when the received signal corresponds to a predefined signal, which is preferably stored in the trailer controller 10. The trailer 60a whose location is to be determined can be identified or its location determined by transmitting back the response signal, which is indicated by the reference number 72 in FIG. 4. The location of the trailer 60a is determined, in particular, automatically. Such determination of location is illustrated schematically in FIG. 4, wherein such determination of location occurs both in a system according to FIG. 2 and according to FIG. 3.

Figures 5A, 5B:
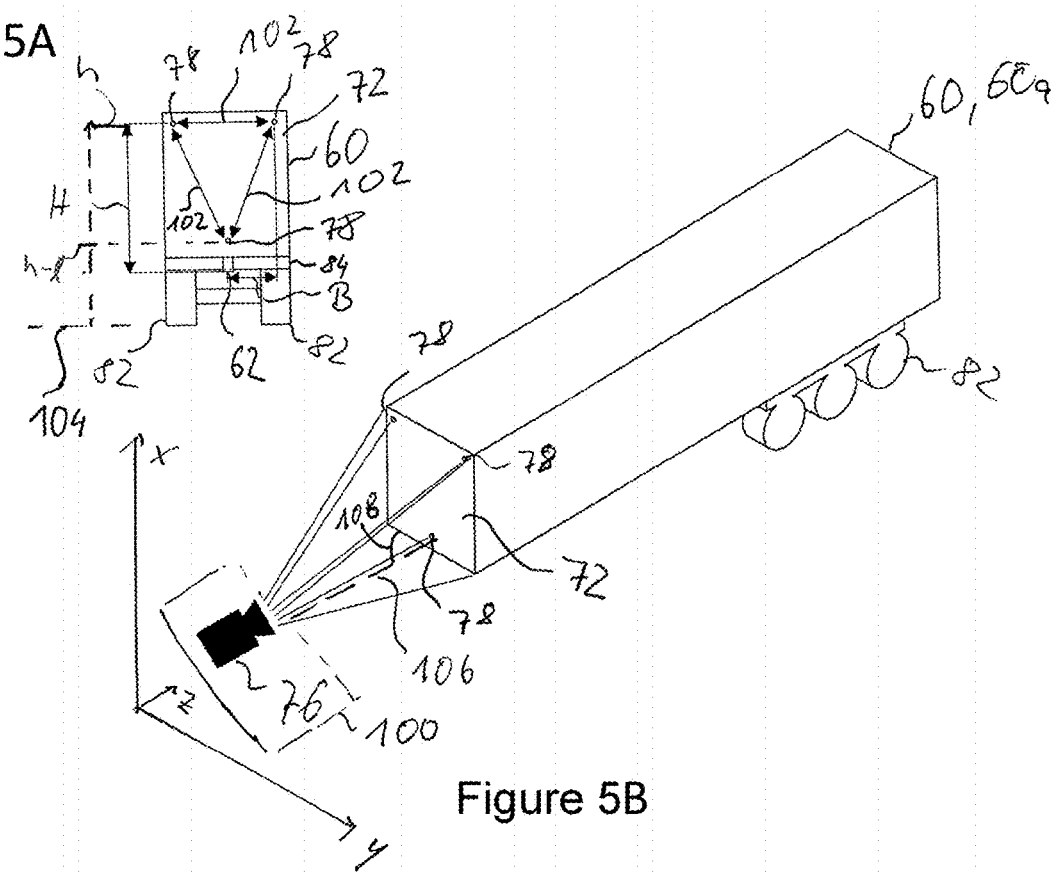
FIGS. 5A and 5B show a trailer according to the invention, in particular a semitrailer, on which a trailer controller is mounted and on which a detectable pattern is arranged.

FIGS. 5A and 5B shows a trailer 60 or a trailer 60a whose location is to be determined and to which a tractor unit 64 is to be coupled after the location of the trailer 60a has been determined. In order to assist the coupling process between the tractor unit 64 and the trailer 60a, the response signal can, in particular, comprise location coordinates which assist automatic coupling between the trailer 60a and the tractor unit 64. A detection unit 100 in the form of a camera system 76, which is preferably arranged on the tractor unit 64 (not illustrated) is illustrated only schematically in FIGS. 5a and 5B. Such a camera system 76 can further assist the coupling process between the tractor unit 64 and the trailer 60, 60a, in particular for visual display for a driver of the tractor unit 64 or, as proposed herein, a detection unit 100 can serve to carry out a coupling process autarkically i.e. without intervention by the driver. In order to assist the coupling process between the trailer 60a and the tractor unit 64, permanently predefined points 78 are arranged on the trailer 60, 60a, which permanently predefined points 78 form a detectable pattern 77 and can be detected by the camera system 76 or the detection unit 100. The permanently predefined points 78 permit the location of the kingpin 62 to be determined, in particular by assisting a driver. This is because a height H and/or a width W of the predefined points 78 with respect to the kingpin 62 of the trailer are permanently predefined and independent of a load of the trailer 62. The predefined points 78 are arranged on a coupling side 72 of the trailer 60, 60a. The coupling side 72 extends in an x-y plane as illustrated in FIG. 5. The trailer then preferably extends along a z axis. The determination of the location of the predefined points 78 can consequently be used by a driver to approach the trailer 62 correctly, and can be detected and used by the camera system 76 to indicate possibly required brief corrections of the tractor unit. In particular, a height h can change as a result of loading the trailer 60, 60a or as a result of the current tire pressure of the tires 82. Therefore, it is significant that the height H is independent of the load state. In particular, a fixed point 78 indicates a distance between the kingpin 62 and an outer edge 84 of the trailer 60, 60a.

Figure 6:
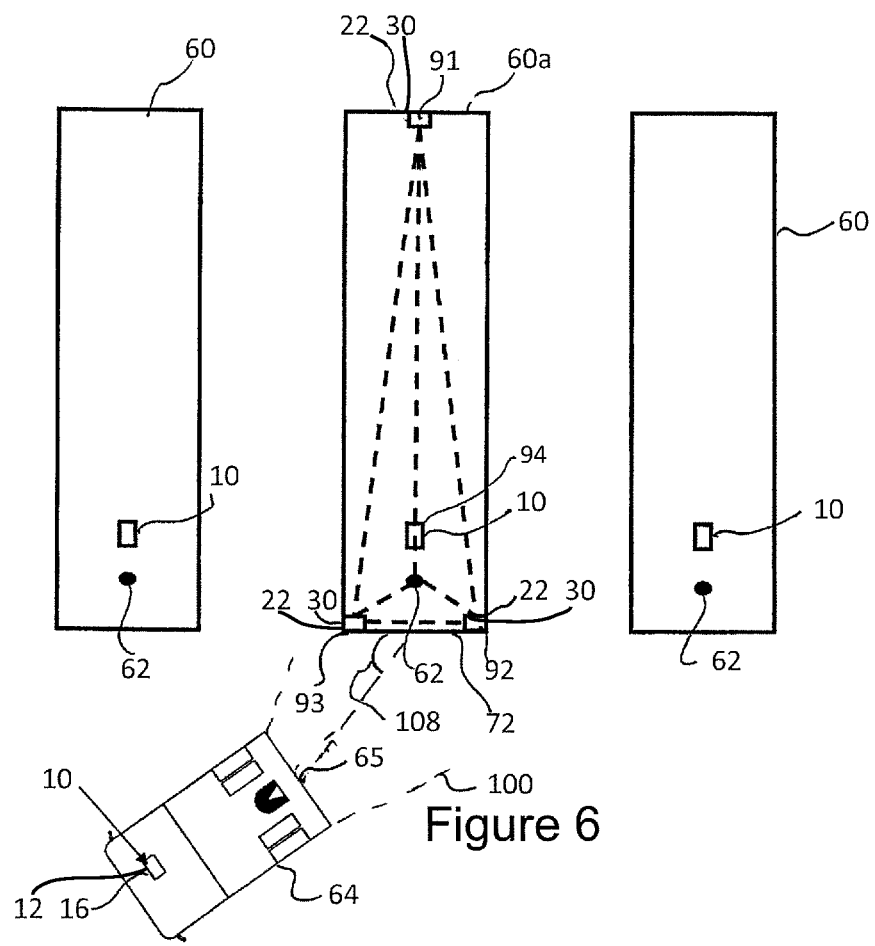
FIG. 6 shows a schematic plan view of a coupling system according to the invention, which can be used after determination of the position and alignment of a trailer to be coupled in a vehicle fleet in a coupling process.

FIG. 6 shows a multiplicity of trailers 60 each with a trailer controller 10 and a kingpin 62. The trailer 60a whose location has been determined also has a coupling system with predefined positions 91, 92, 93 of the trailer 60, 60a whose location has been determined. The predefined positions 91, 92, 93 on the trailer 60, 60a can each be detected by means of a transceiver unit. The detected positions 91, 92, 93 can then be evaluated by means of an evaluation unit 37 which is integrated into the trailer controller 10. For example straight lines or planes through the detected points 91, 92, 93 are acquired in the evaluation unit 37. It is also conceivable that the trailer controller 10 also constitutes a detected position 94. The detected positions 91-94 can then be determined, for example, in relation to the kingpin 62 of the trailer 60a whose location has been determined. The transceiver unit of the trailer 60, 60a interrogates the current position, i.e. the coordinates of the corresponding predefined point 91-94, via an external GPS system 70 or via local transmission masts, for example. By means of the detected points 91-94, the position and alignment of the trailer 60, 60a is determined, in particular in relation to the kingpin, using software, and stored, if appropriate, in the memory unit 28. The necessary position data are preferably transmitted by means of a wireless connection from the trailer controller 10 to a tractor unit 64, so that the tractor unit 64 can actuate the trailer 60a whose location has been determined, and coupling can be carried out between the tractor unit 64 and the trailer 60a.

After the location of the trailer 60a has been determined, the tractor unit 64 actuates the trailer 60a whose location has been found, in order to couple said trailer. In order to carry out a coupling process, the detection unit 100, which comprises, in particular, a camera system 76 and/or a sensor system and is arranged on a coupling side 65 of the tractor unit 64, detects the detectable pattern 77 on a coupling side 72 of the trailer 60, 60a, wherein the detectable pattern 77 is given by the predefined point 78. The detection unit 100 can detect the detectable pattern 77, for example by means of ultrasonic sound and/or optically or the like. As illustrated in FIGS. 5A and 5B, the predefined points 78 are arranged in a triangular configuration on the coupling side 72, wherein two predefined points are each arranged at an upper outer region above the surface 104 of the Earth at a height h, and a permanently predefined point 78 above the kingpin 62 is arranged at a height h-1 above the surface 104 of the Earth, wherein the height h-1 is less than the height h. It is conceivable that the detectable pattern 77 is arranged in another configuration of the permanently predefined points on the coupling side 72, in particular with a different number of permanently predefined points. The detection unit 100 is connected to a control unit, in particular by a wired connection or by a wireless connection, in order to evaluate the detectable pattern 77. When an evaluation occurs, in particular by means of triangulation, a current distance 106 and/or a current angle 108 are/is determined between the trailer 60, 60a and the tractor unit 64 and/or a height h of the trailer 60, 60a. The evaluation is preferably carried out on the basis of the subset of pixels which have detected the detectable pattern 77. If the current angle 108 and/or the current distance 106 is not provided for an optimum coupling process, for example wheel settings of the tractor unit 64 can be changed so that a coupling process can be carried out as well as possible. The permanently predefined points 78 are arranged on the coupling side 72 of the trailer 60, 60a at a permanently predefined distance 102. A permanently predefined distance 102 between two permanently predefined points 78 can be different from a permanently predefined distance 102 between two other permanently predefined points 78, as is apparent, for example, from the triangular configuration according to FIG. 5.

The detection unit 100, in particular the camera system 75, detects an image with a permanently predefined total number of pixels, wherein the detectable pattern 77 and/or the trailer edges are/is detected in a subset of the total number of pixels, and by evaluating the subset of pixels at which the detectable pattern 77 and/or the trailer edges is/are detected it is possible to acquire a current distance 106 and/or an angle 108 between the detection unit 100 and the trailer 60, 60a. In particular, a height h of the trailer 60, 60a from the surface 104 of the Earth can be acquired by the detection unit 100. The detected height h consequently indicates a distance from the surface 104 of the Earth, as a result of which a load state of the trailer 60, 60a can be estimated. In particular, the determination of the height h makes it possible to detect overloading of the trailer 60, 60a, in the case of which a coupling process would cause damage to the tractor unit 64 and/or the trailer 60, 60a. The lower the number of the pixels which detect the detectable pattern 77, the greater the current distance 106 between the trailer 60, 60a and the tractor unit 64. On the other hand, the higher the number of pixels which detect the detectable pattern 77, the smaller the current distance 106 between the trailer 60, 60a and the tractor unit 64. In addition, an asymmetrical distribution of the subset of pixels which have detected the detectable pattern 77 indicates that the trailer 60, 60a and the tractor unit 64 are at an angle 108 with respect to one another. The term asymmetrical distribution means here that, for example, in a region on the coupling side 72 a number n>0 of pixels has detected a permanently predefined point 78, while a different symmetrically arranged, permanently predefined point 78 is detected only by a number m>0 of pixels, wherein m<n, and m and n are natural integers. If an angle of approximately 90° were provided between an extent of the detection unit 100 and the coupling side 72, it would be the case that m=n. This is equivalent to an extent of the detection unit 100 parallel to the extent of the trailer 60, 60a in the z direction (see FIGS. 5A and 5B).

LIST OF DESIGNATIONS

10. Trailer controller
12. Transmitter unit
14. Signal transmission
16. Receiver unit
18. Signal transmission
20. Receiver unit
24. Comparator
26. Signal transmission
28. Memory unit
30. Transmitter unit
32. Signal transmission
34. Energy source
36. Position-determining unit
37. Evaluation unit
38. Encryption unit/decryption unit
38a. Decryption unit
38b. Encryption unit
40-50. Signal transmission
60. Trailer
62. Kingpin
64. Tractor unit
65. Coupling side of tractor unit
66. Signal transmission
68. Signal transmission
70. External GPS unit
72. Coupling side of trailer
76. Camera system
77. Detectable pattern
78. Fixed point
80. System
82. Tire
84. Edge
91-94. Predefined position or predefined region
100. Detection unit
102. Predefined distance
104. Surface of the Earth
106. Current distance
108. Angle
H. Height
W. Width
h. Height with respect to the surface of the Earth
h–l. Height with respect to the surface of the Earth, wherein h–l<h

The invention claimed is:

1. A trailer, comprising:
a kingpin or a drawbar configured to couple to a tractor unit on a coupling side of the trailer; and
a detectable pattern arranged on the coupling side of the trailer and configured for identifying the trailer;
wherein a predefined distance between the detectable pattern of the coupling side of the trailer and the kingpin or the drawbar is stored in the detectable pattern, and wherein the predefined distance is stored in a color code or a barcode or a matrix code; and
wherein the detectable pattern includes at least two permanently predefined points that are arranged on the coupling side of the trailer such that a ratio between a distance between the at least two permanent predefined points and an extent of the coupling side of the trailer in a vertical and/or a horizontal direction is between 0.5 and 0.99.

2. The trailer as claimed in claim 1, wherein the detectable pattern comprises at least one permanently predefined point which can be detected by a detection unit.

3. The trailer as claimed in claim 2, wherein at least one of the at least one permanent predefined point includes an active light emission.

4. The trailer as claimed in claim 2, wherein the at least one permanently predefined point includes at least two permanently predefined points.

5. The trailer as claimed in claim 4, when the at least two predefined permanent points include an active light emission, and wherein the at least two predefined permanent points emit light in different colors.

6. The trailer as claimed in claim 4, when the at least two predefined permanent points include a passive light emission, and wherein the at least two predefined permanent points emit light in different colors.

7. The trailer as claimed in claim 2, wherein at least one point of the at least one permanently predefined points is actively light-emitting, and wherein the emitted light is dynamically variable.

8. The trailer as claimed in claim 1, wherein the detectable pattern is arranged in a predefined region on the coupling side of the trailer such that after the detectable pattern has been detected by a detection unit the position of the kingpin or of the drawbar may be determined.

9. The trailer as claimed in claim 1, wherein the ratio is between 0.8 and 0.98.

10. A trailer, comprising:
a kingpin or a drawbar configured to couple to a tractor unit on a coupling side of the trailer; and
a detectable pattern arranged on the coupling side of the trailer and configured for identifying the trailer;
wherein a predefined distance between the detectable pattern of the coupling side of the trailer and the kingpin or the drawbar is stored in the detectable pattern, and wherein the predefined distance is stored in a color code or a barcode or a matrix code; and
wherein two permanently predefined points of the detectable pattern are arranged on an upper outer end region of the coupling side of the trailer and extending at a height from the surface of the Earth, and wherein at least one predefined point of the detectable pattern is arranged in a region above the kingpin on the coupling side of the trailer such that the at least one predefined point arranged in the region above the kingpin forms a triangular configuration with the two permanently predefined points on the upper end region.

11. A coupling system for identifying a trailer and/or for assisting a coupling process between a trailer and a tractor unit, comprising:
a trailer, comprising:
a kingpin or a drawbar configured to couple to a tractor unit on a coupling side of the trailer; and
a detectable pattern on the coupling side of the trailer and configured for identifying the trailer;
wherein a predefined distance between the detectable pattern of the coupling side of the trailer and the kingpin or the drawbar is stored in the pattern, and wherein the predefined distance is stored in a color code or a barcode or a matrix code; and
a tractor unit for coupling to the kingpin or the drawbar of the trailer;
wherein the tractor unit includes a detection unit on a coupling side of the tractor unit for detecting a detectable pattern for identifying the trailer;

wherein the coupling system is configured to carry out a coupling process between the trailer and the tractor unit automatically; and wherein the detection unit is configured to detect trailer edges of the trailer to be coupled in order to determine a spatial ratio between the trailer edges and/or between the trailer edges and the detectable pattern such that an alignment of the trailer to be coupled and/or a distance from the tractor unit to the trailer can be determined.

12. The coupling system as claimed in claim 11, wherein the detection unit comprises a camera and/or a sensor configured to detect the detectable pattern of the trailer.

13. The coupling system as claimed in claim 11, wherein the detection unit is configured to detect a distance and/or an angle with respect to the detectable pattern of the trailer to determine a current alignment of the trailer to be coupled and/or a distance from the tractor unit to the trailer.

14. A coupling system for identifying a trailer and/or for assisting a coupling process between a a trailer and a tractor unit, comprising:

a trailer, comprising:
   a kingpin or a drawbar configured to couple to a tractor unit on a coupling side of the trailer; and
   a detectable pattern on the coupling side of the trailer and configured for identifying the trailer;
   wherein a predefined distance between the detectable pattern of the coupling side of the trailer and the kingpin or the drawbar is stored in the pattern; and
   wherein the predefined distance is stored in a color code or a barcode or a matrix code; and a tractor unit for coupling to the kingpin or the drawbar of the trailer;

wherein the tractor unit includes a detection unit on a coupling side of the tractor unit for detecting a detectable pattern for identifying the trailer;

wherein the coupling system is configured to carry out a coupling process between the trailer and the tractor unit automatically; and wherein a camera of the detection unit detects an image with a permanently predefined total number of pixels, wherein the detectable pattern and/or trailer edges of the trailer are detected in a subset of the total number of pixels, and by evaluating the subset of pixels at which the detectable pattern and/or the trailer edges are detected a current distance and/or an angle between the detection unit and the trailer, may be acquired wherein a height of the trailer or of the kingpin from the surface of the Earth or a height with respect to the detection unit may be acquired by the detection unit.

* * * * *